(12) United States Patent
Abildgaard et al.

(10) Patent No.: US 8,887,570 B2
(45) Date of Patent: Nov. 18, 2014

(54) CONTACT DETECTION

(75) Inventors: Max Abildgaard, Braunschweig (DE); Robin Lantzsch, Berlin (DE); Mario Muellhaeuser, Braunschweig (DE)

(73) Assignee: Deutsches Zentrum fuer Luft—und Raumfahrt E.V., Cologne (DE)

( * ) Notice: Subject to any disclaimer, the term of this patent is extended or adjusted under 35 U.S.C. 154(b) by 399 days.

(21) Appl. No.: 13/098,513

(22) Filed: May 2, 2011

(65) Prior Publication Data
US 2011/0266396 A1 Nov. 3, 2011

(30) Foreign Application Priority Data
May 3, 2010 (DE) .......................... 10 2010 019 236

(51) Int. Cl.
*G01N 29/36* (2006.01)
*B60W 40/08* (2012.01)
*B60W 50/00* (2006.01)
*B60K 26/02* (2006.01)
*B60K 26/04* (2006.01)

(52) U.S. Cl.
CPC ....... *B60W 40/08* (2013.01); *B60W 2050/0057* (2013.01); *B60K 2026/029* (2013.01); *B60K 2026/046* (2013.01); *B60Y 2200/52* (2013.01)
USPC ................. 73/579; 73/593; 73/659

(58) Field of Classification Search
USPC .................... 73/579, 593, 659, 660
See application file for complete search history.

(56) References Cited

U.S. PATENT DOCUMENTS

| | | | | |
|---|---|---|---|---|
| 3,970,840 A * | 7/1976 | De Bruine | ..................... | 250/202 |
| 4,024,651 A * | 5/1977 | Lantrip | ........................... | 434/45 |
| 5,057,834 A | 10/1991 | Nordstrom | | |
| 5,149,023 A * | 9/1992 | Sakurai et al. | ................ | 244/229 |
| 5,798,695 A * | 8/1998 | Metalis et al. | ................ | 340/576 |
| 6,263,997 B1 * | 7/2001 | Breuning et al. | ............. | 180/402 |
| 6,374,163 B1 * | 4/2002 | Lou et al. | ......................... | 701/1 |
| 6,625,530 B1 * | 9/2003 | Bolourchi | ....................... | 701/42 |
| 6,644,600 B1 * | 11/2003 | Olson et al. | .................... | 244/221 |
| 6,678,567 B1 * | 1/2004 | Haendel | ........................... | 700/85 |
| 6,895,357 B2 * | 5/2005 | Lou et al. | ...................... | 702/151 |
| 7,658,349 B2 * | 2/2010 | Abel et al. | ..................... | 244/223 |
| 7,694,913 B2 * | 4/2010 | Lindahl | .......................... | 244/50 |
| 7,759,894 B2 * | 7/2010 | Marino et al. | ........... | 318/568.11 |

FOREIGN PATENT DOCUMENTS

| | | |
|---|---|---|
| DE | 195 15 429 | 12/1995 |
| DE | 19515429 A1 | 12/1995 |
| DE | 10155083 A1 | 9/2002 |
| DE | 103 58 494 | 7/2005 |
| DE | 10358494 A1 | 7/2005 |
| DE | 102005056438 A1 | 6/2007 |
| DE | 10 2007 039 332 | 2/2008 |
| DE | 102007039332 A1 | 2/2008 |
| DE | 10 2008 021 150 | 8/2009 |
| DE | 102008021150 A1 | 8/2009 |
| DE | 102008033722 A1 | 1/2010 |
| DE | 10 2008 033 722 | 4/2011 |

* cited by examiner

*Primary Examiner* — J M Saint Surin
(74) *Attorney, Agent, or Firm* — Whitham Curtis Christofferson & Cook, PC

(57) ABSTRACT

A method provides detecting a contact state between at least one driver/operator of a vehicle and a control input device designed to control the vehicle, where a frequency spectrum is calculated from sensors detected movement signals based on which the contact state between the control input device and the driver/operator is determined.

16 Claims, 2 Drawing Sheets

CONTACT DETECTION

CROSS REFERENCE TO RELATED APPLICATIONS

This application claims the priority of German Patent Application No. DE 10 2010 019 236.8 filed May 3, 2010.

FIELD OF THE INVENTION

The invention relates to a method for detecting a contact state between at least one driver/operator of a vehicle and a vehicle with a set up control-input-device to control the vehicle. The invention also relates to a control-input-device for this purpose.

BACKGROUND

The active control devices for vehicles currently known to be in development, especially for aircraft, also called active side-sticks, do have over the conventional inceptors the advantage that artificial corresponding control forces can be applied by actuators to the control input device so that the driver of the vehicle gets a real control-feeling. Therefore, the operator or driver has the feeling that the control input device actually represents mechanical elements, such as springs, masses, buffers or friction brakes, and is mechanically connected to the control elements of the vehicle, such as elevator assembly or rudder.

Such active inceptors can also be utilized to transmit to the operator or driver tactile information so as to provide an additional information channel. Such tactile information could be represented differently, for example by vibration for non-directional information or local force variations for directional information. A local force variation in the form of a so-called soft stop does have—for instance—the effect that the spring force gradient increases markedly from a certain position on so that the operator or vehicle driver can be informed in a haptic way about the reaching of any limit which is dependent on the path of the control. Such indications are also called "tactile cues". The decision to follow such a "tactile cue" or to bypass it is up to the operator or driver.

A big problem with this type of information transmission constitutes the fact that the operator or driver must be in contact with the control-input-device so that information transmission can take place on this information channel and so that the tactile indication which is placed on the control-input-device can be perceived by the driver. If the vehicle—for instance—is controlled using a manual control input device (sidestick, joystick) the driver must clasp the control input device with his hand in order to be able to perceive the information. Would he let go, the control surface would follow the force gradient of the "tactile cues", unnoticed by the driver/operator which in turn means that the vehicle would follow the applied control movement. It should be noted that the force applied to the inceptor should not represent any real control movement of the vehicle, but merely serve to provide to the driver/operator a piece of information. That the vehicle has carried out a control movement due to the "tactile cues" would be noticed by the driver only if the motion deviation would be greater than his perception threshold which can lead to dangerous situations.

It is therefore very important that with this type of control input device that information for the driver/operator is applied to the inceptor only after the control input device has detected for certain that the driver/operator is in contact with the control input device of the vehicle, i.e. is clasping it with his hand.

Another application which makes detecting a contact state necessary is to stabilize the control input device itself. The control input device is subject to accelerations which are caused by gravitational acceleration, the movement of the aircraft or vibration. The control sensors of the control input device can not differentiate these inertia forces from the desired forces of the driver/operator which can lead to unintended control inputs. Control contact detection can be used within the control surface so fact it can only be adjusted if a hand is placed on it or is grasping it.

From DE 10 2007 039 332 A1 a method and steering assistance for the detection of a contact state is known to detect if at least one hand of a driver is grasping the steering handle of a vehicle. In this method a contact state of the hand on the steering wheel is detected by comparing the measured sensor data for a moment sensor and an angular sensor with a model of a free steering movement which is done via a so-called state observers. The state observer estimates if the driver's steering torque moments and determines whether the hands are on the steering handle. The disadvantage is that an accurate modeling of the steering mechanics is required, and ultimately the state observer can only give an estimate and such estimate is not enough for reliable detection if a hand is grasping a control device during flight operations.

Furthermore, DE 10 2008 021 150 A1 discloses a method in which a lack of driver activity is determined over a period of time, i.e. indirect detection of the probability of a contact can be determined in regards to the steering handle. For this purpose the steering activity is determined over a certain period of time and stored, thus it can be determined if, over a period, steering activities have taken place. Over a threshold value it can then be determined based on inactivity over a time period if there has been any inactivity due to lack of contact. This method also has the disadvantage that it can not precisely determine whether a contact between the driver/operator and control input device does actually exist. Additionally, this method can not determine whether it is an intentional, unintentional or manual control device angle change which was caused by acceleration, as only the driver activity is checked.

Another method which relates to the analysis of driver activities, from DE 103 58 494 A1, is known, where the driver's actual behavior in a given situation is compared with a predetermined reference handling. If it is detected that the actual behavior of the driver deviates much from the reference behavior stored in a database, in this given situation, for example, at very high speed, then the driver assistance system is activated and takes over to prevent serious accidents. Again, only lack of driver activity can be concluded, but not whether there is actually a physical contact between the control input device and driver/operator.

The methods known of current state of the art all have presently the disadvantage for the task at hand that they can not ascertain with sufficient accuracy if actual physical contact between the control input device and driver/operator does exist, however, this is especially needed during flight operation. Without such a sufficient accurate "hands-on" detection active control input devices in aircrafts can not be operated safely.

SUMMARY

In view of the foregoing, it is therefore an object of the invention currently under consideration to provide a reliable method that can detect contact between the driver/operator and the vehicle's control input device.

The task or problem is solved with the aforementioned method relating to the invention by:
determining a frequency spectrum covered by means of sensors and their detected movement signals of the control input device over time and
detecting of the contact state as a function of the determined spectrum.

The control input device, such as a side stick, is equipped with sensors which detect the movement of the inceptor. These movement signals are typically used to control the vehicle, for instance the "fly-by-wire" operation. It has been found that, based on the frequency spectrum of these movement signals, it can be determined whether the driver or operator maintains physical contact with the control input device. Therefore, the control input device determines, based on these detected movement signals the corresponding frequency spectrum which can be detected using this spectrum, and whether the driver/operator is in contact with the control input device or not.

This is based on the principle that the operator, if he grasps the control input device with his hand, the system of the active control surface changes in such a way that a new mechanical system results as the mechanics of the control surface along with the mass of the hand and arm and elasticity of the skin and tissue, the muscles and joints change the whole system. Due to this new mechanical whole system the oscillatory behavior changes naturally so that the characteristics of the frequency spectrum of the un-grasped control surface is different from the grasped control surface, this means one can conclude with reliability whether contact between the hand and control surface does exist. The difference between "hands-on" and "hands off" is visible in the spectrum of the measured sensor signals.

The sensors can be so-called position sensors which detect the movement signals of the control input device using time. Such position sensors may be, in particular, angle and/or position sensors, but could also be force sensors which determine the corresponding applied force gradients by the operator. And acceleration sensors can be used as well.

It is especially advantageous if from the detected frequency range of the motion signals certain frequency ranges get filtered and a "hands-on" detection is only used based on the filtered frequency ranges. For example, it was found that in higher frequency ranges characteristic vibrations can be detected which are composed of vibrations from the surroundings of the control surface. If the control surface is now used/grasped by the driver, these frequencies change accordingly which then can be detected.

Advantageously, the detection can be by comparison between a calculated reference spectrum with the calculated frequency spectrum. This is particularly advantageous since the frequency spectrum which results when the driver has no hand at the control surface may vary from vehicle to vehicle due to the different vehicle body from vehicle to vehicle.

It is especially advantageous when vibrations are detected in the vicinity of the control input device using sensors and are used to detect the contact state based on the determined frequency spectrum. These vibrations in the vicinity of the control input device result from the movement of the vehicle itself such as a helicopter that vibrates strongly. If the driver/operator does not grasp the control surface these vibrations are transferred involuntarily to the control surface which can be detected using the sensors. In the calculated frequency spectrum one can find these vibrations in almost identical form. However, if the driver does grasp the control surface the vibrations are absorbed due to the new mechanical system as a whole and changes in the vibration damping properties so that a contact state can be detected by this change.

Furthermore, it was found that due to the change of the frequency spectrum the grip strength can be detected as well, since with increasing grip strength the frequency spectrum changes as well. Therefore, it is particularly advantageous if, additionally, the grip strength in case of manual contact with the control can be determined based on the frequency spectrum.

Furthermore, the task is also solved with a control input device for controlling a vehicle. The control input device includes sensors for detecting movement signals from the control input device where, using a central processing unit, the frequency spectrum is detected based on the detected motion signals from which the contact state as a function of the detected frequency spectrum can be determined.

DESCRIPTION OF THE DRAWINGS

The invention currently under consideration is illustrated exemplary in the accompanying drawings. The following is depicted.

DETAILED DESCRIPTION

Figure 1:
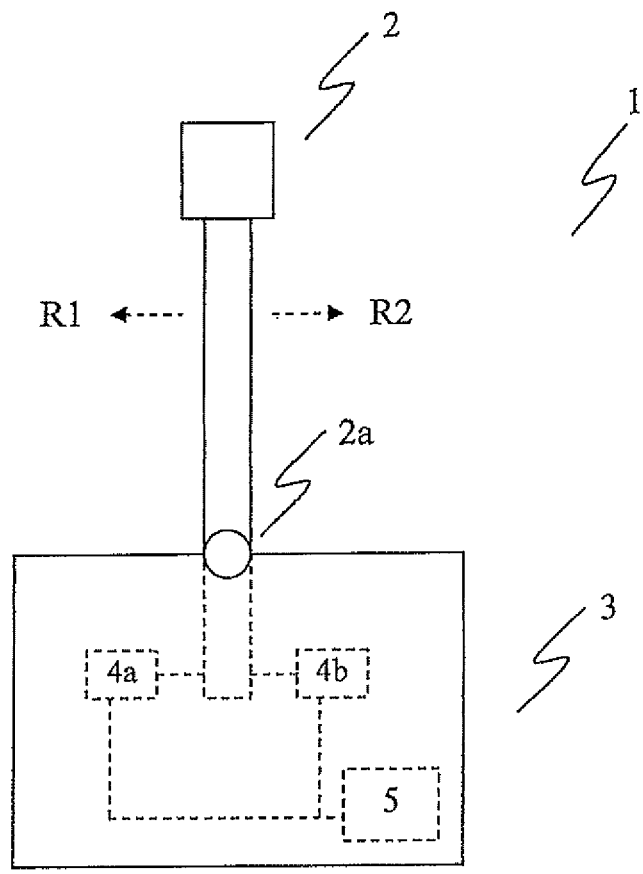
FIG. 1—schematic representation of a control input device based on the invention related method.

FIG. 1 shows schematically a control input device 1 composed of a control stick 2 and a mechanism 3. By way of example, let's assume that the control stick 2 can be pivoted about the suspension 2a in both directions R1 and R2. The pivot directions are marked with two arrows.

In mechanism 3 there are appropriate sensors 4a, 4b which determine very accurately the movement signals in the pivoting directions R1 and R2. The sensors 4a, 4b can be, for instance, angle or position sensors that detect a certain deflection of the control stick 2 in one of the pivoting directions R1 or R2. The movement signals determined by the sensors 4a, 4b are then transmitted to a processing unit 5 which then determined from the determined motion signals the frequency spectrum against which the contact state is then determined. This analysis of the frequency spectrum can also occur in the processing unit 5.

As mentioned above, the frequency spectrum changes due to the driver/operator having contact with the control input device 1 so that, based on this analysis in the processing unit 5 it can be concluded with reliability if the driver/operator is in contact with the control input device 1.

For instance, such a control input device can be used to control a helicopter, where, using the active side-stick 2, the collective angle of attack can be controlled. With the collective angle of attack adjustments the performance of the helicopter can be controlled as a function of flight attitude. Based on the active side-stick 2 a tactile function for observance with the performance limits can be implemented in order to provide to the pilot an additional channel of information between the human-machine-interface. If the limit is reached the active side stick generates a downward force, i.e. in the direction of lower performance until the currently commanded power is less than the permitted power. The pilot feels the force at the control device and follows.

Let's assume the pilot takes his hand from the control surface while the helicopter is in flight attitude close to the performance limit so that the tactile information channel is not available to him. If in such a situation—due to external disturbances—the instantaneous power increases than the tactile functions would generate a force to try to move the control device down. Since the pilot does no have his hand at control device he can not prevent this on the one hand and on the other hand he realizes this only when the helicopter has already responded to the unwanted control command. The pilot is "out-of-the-loop" which can be very dangerous in various flight situations. By the detection of the hand contact between the control input device and the pilot such can be prevented so that the pilot keeps full situational awareness.

Figure 2:
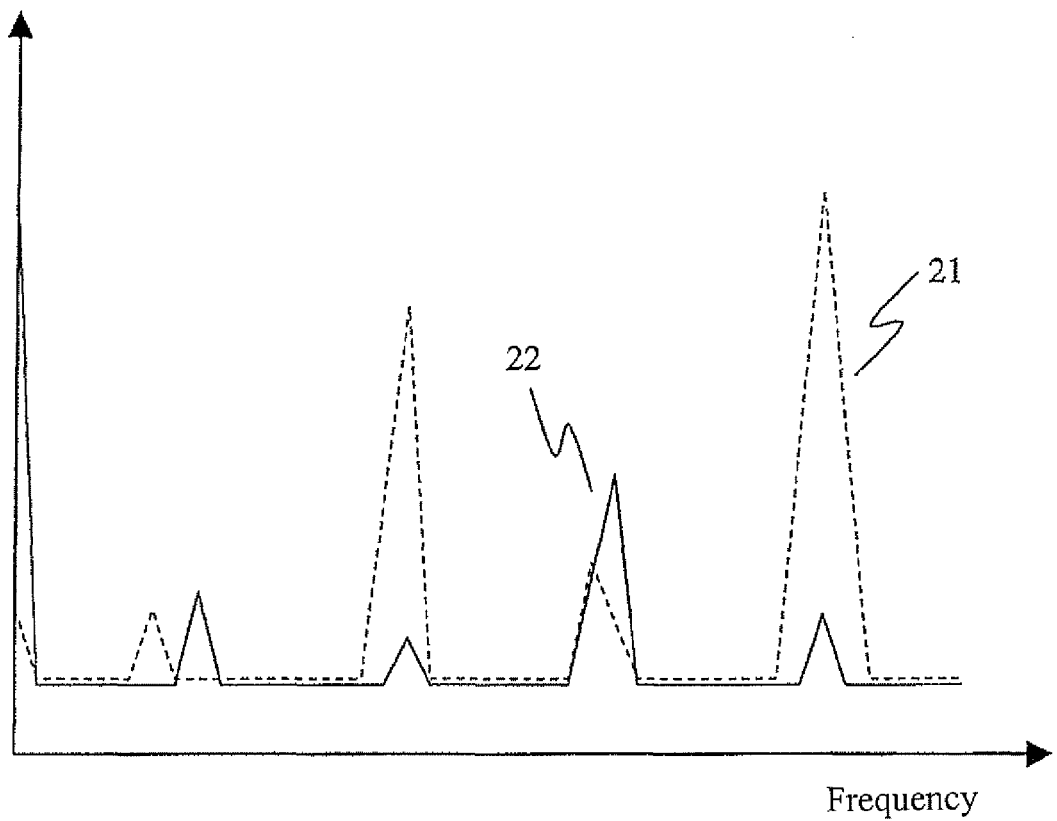
FIG. 2—schematic representation of two frequency spectra.

FIG. 2 shows schematically two power spectra 21 and 22, as can be determined by the processing unit 5 of FIG. 1. As can be seen in the frequency range 21 there are large amplitude fluctuations in the frequencies indicating that the driver is not in contact with the control input device. Only when the driver grasps the control stick with his hand so that a new overall system and thus altered mechanism results does the power or frequency spectrum change in the direction of the represented spectrum 22 where the frequency shown is now at low performance. This is ultimately due to the fact that there is an altered mechanical system as a whole, consisting of control stick and the pilot, the damping properties were changed significantly, so that the frequencies are attenuated in particular by the physiology of man. This can then ultimately be seen on the modified frequency spectrum.

A major advantage of this method, in particular, is that almost all control elements equipped with such a movement sensors can be retrofitted to employ this method. Thus, already existing sensors can be used without having to perform expensive and complicated retrofit measures. Furthermore, this method provides—due to the distinctive characteristics of the frequency spectrum—a reliable way to determine the contact state between the control input device and the driver/operator.

The invention claimed is:

1. A method for detecting contact between a control input device of a vehicle and at least one driver or operator of said vehicle, comprising the steps of:
   detecting oscillatory behavior of said control input device using one or more motion sensors;
   calculating with a processing unit a frequency spectrum from said oscillatory behavior detected in said detecting step;
   determining a contact force based on said frequency spectrum; and
   determining whether or not physical contact exists between said control input device and said at least one driver or operator based on said frequency spectrum.

2. The method of claim 1, wherein said one or more motion sensors of said detecting step are one or more of angle sensors, position sensors, force sensors, and acceleration sensors.

3. The method of claim 1, further comprising the step of filtering a frequency range of said frequency spectrum and using said frequency range in said second determining step.

4. The method of claim 1, wherein said second determining step includes a comparison between said frequency spectrum of said calculating step and a stored reference frequency spectrum.

5. The method of claim 1, wherein said detecting step further includes detecting vehicle vibrations by sensors in a vicinity of the control input device and said step of determining whether or not physical contact exists between said control input device and said at least one driver or operator considers said vehicle vibrations.

6. The method of claim 1, wherein said physical contact is between at least one hand of said driver or operator and said control input device.

7. The method of claim 1, wherein said control input device is grippable by a hand of said at least one driver or operator and said contact force is a grip strength.

8. A control input device for controlling a vehicle, comprising:
   one or more motion sensors which detect oscillatory behavior of said control input device; and
   a processing unit configured to perform the steps comprising:
      calculating a frequency spectrum from said oscillatory behavior of said control input device detected by said one or more motion sensors,
      determining a contact force based on said frequency spectrum, and
      determining whether or not physical contact exists between said control input device and said at least one driver or operator based on said frequency spectrum.

9. The control input device according to claim 8, wherein said vehicle is an aircraft and said control input device is a side stick graspable by said at least one driver or operator for controlling said aircraft.

10. The control input device according to claim 8, wherein said processing unit is configured to connect with at least one sensor which detects vehicle vibrations in a vicinity of the control input device and wherein said processing unit considers said vehicle vibrations when determining whether or not physical contact exists between said control input device and said at least one driver or operator.

11. The control input device of claim 8, wherein said one or more motion sensors are one or more of angle sensors, position sensors, force sensors, and acceleration sensors.

12. The control input device of claim 8, wherein said processing unit is further configured to perform the step of filtering said frequency spectrum for a frequency range prior to said second determining step.

13. The control input device of claim 8, wherein said processing unit is further configured to perform the step of comparing said frequency spectrum of said calculating step and a stored reference frequency spectrum.

14. The control input device of claim 8, wherein said control input device is grippable by a hand of said at least one driver or operator and said contact force is a grip strength.

15. The control input device of claim 8, wherein said physical contact is between at least one hand of said driver or operator and said control input device.

16. A method for detecting contact between a control input device of a vehicle and at least one driver or operator of said vehicle, comprising the steps of:
   detecting oscillatory behavior of said control input device using one or more motion sensors, said oscillatory behavior including vibrations of said vehicle;
   calculating with a processing unit a frequency spectrum from said oscillatory behavior including said vibrations detected in said detecting step; and
   determining whether or not physical contact exists between said control input device and said at least one driver or operator based on said frequency spectrum.

* * * * *